May 5, 1942.  J. S. NEWTON  2,282,237
COMBINED ELECTRIC COUPLING AND REVERSE GEAR
Filed Jan. 8, 1941
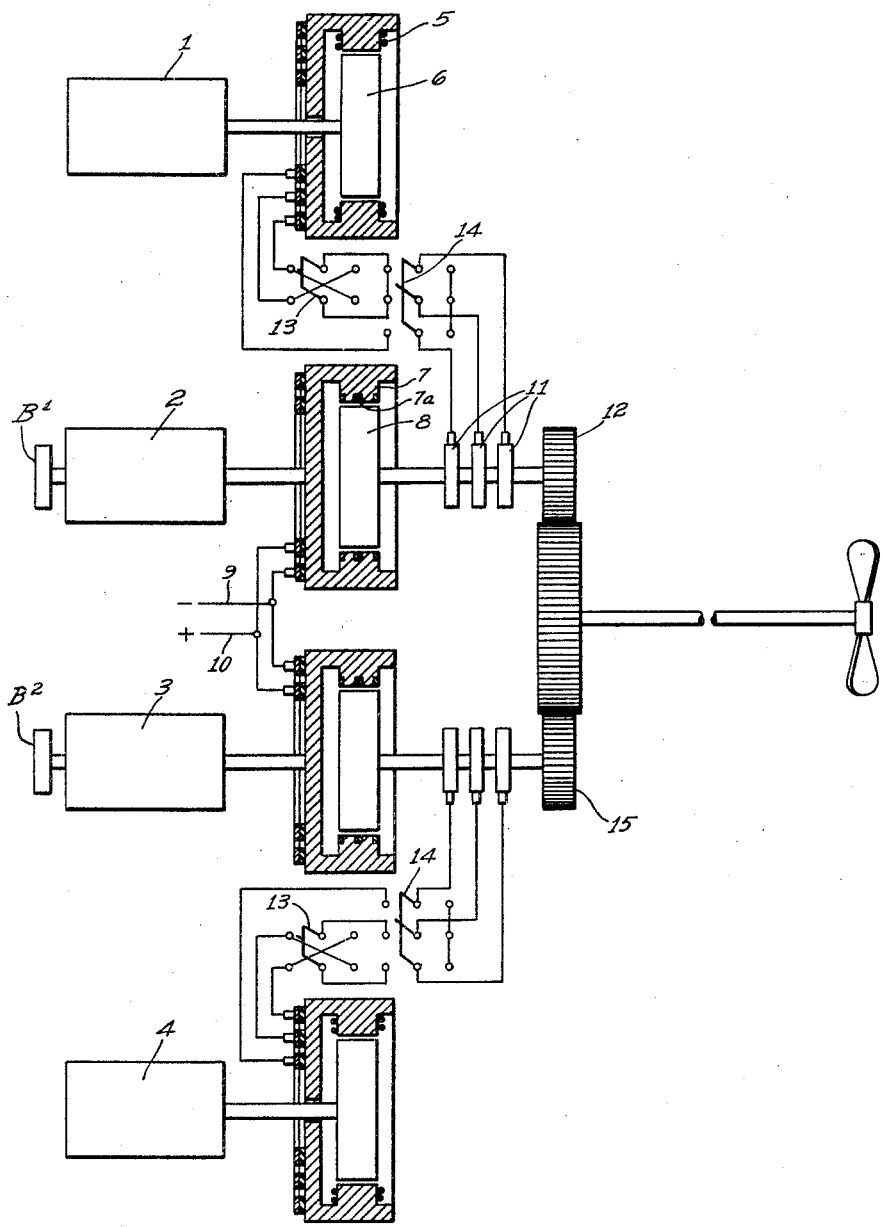
WITNESSES:
INVENTOR
John S. Newton.
BY
ATTORNEY Patented May 5, 1942

2,282,237

UNITED STATES PATENT OFFICE 2,282,237

COMBINED ELECTRIC COUPLING AND REVERSE GEAR

John S. Newton, Drexel Hill, Pa., assignor to Westinghouse Electric & Manufacturing Company, East Pittsburgh, Pa., a corporation of Pennsylvania Application January 8, 1941, Serial No. 373,593

13 Claims. (Cl. 172—8)

My invention relates to an electromagnetic drive of general application and which is specifically advantageous in ship propulsion systems.

An object of my invention is to provide a reversible ship propulsion drive which is relatively simple, easy to install and operate, and inexpensive.

Another object of my invention is to provide a plurality of engines for driving a single propeller, any of which engines may be readily excluded from the system and some of which engines are reversible while the remaining are non-reversible for providing a selectively reversible multi-speed drive.

Another object of my invention is to provide two super-imposed sources of alternating current for applying energy to a single drive shaft in a manner so as to provide a speed on such drive shaft which is double the speed of either of the speeds of the sources of alternating current energy.

Other objects and advantages will become more apparent from a study of the following specification when considered in connection with the accompanying drawing, in which the single figure is a schematic showing of a ship propulsion system embodying the principles of my invention.

Referring more particularly to the drawing, numerals 1, 2, 3 and 4 designate prime movers such as Diesel engines, of which engines 1 and 4 are non-reversible, while engines 2 and 3 are reversible. Engine 1 drives an alternating current generator comprising a phase wound stator 5 and a salient pole rotor 6. Engine 2 drives an electromagnetic coupling, which coupling comprises a salient pole driving member 7 and a wound rotor driven element 8. The driving element has its salient poles energized by a direct current source of energy indicated by terminals 9 and 10. The wound rotor and driven element has mechanically coupled thereto slip rings 11 and a pinion 12. The wound rotor on element 8 is electrically connected to the slip rings 11. The phase wound stator 5 is also electrically connected to slip rings 11 through a phase reversing switch 13 and a short-circuiting switch 14. When switch 14 short-circuits the rotor winding on driven element 8, there will be a direct electromagnetic coupling with a very small amount of slip between elements 7 and 8, thereby making it possible to drive pinion 12 at substantially the same speed as engine 2 in either direction (inasmuch as engine 2 is reversible). Then if the engine 1 is in operation, the electrical energy from phase wound stator 5 may be supplied to slip rings 11 so as to superimpose a frequency derived from engine 1 upon the frequency derived from engine 2. It will be noted that by suitable operation of the phase reversing switch 13 and the suitable selection of direction of rotation of engine 2, it will be possible to drive pinion 12 at double the engine speed at full load. In operation, the alternating current generator 5—6 would have to be synchronized with the wound rotor element 8 of the coupling which would require, for example, a damper winding 7a on the pole faces on the salient pole element of the coupling. Such damper winding and other details of the electromagnetic coupling in themselves form no part of the present invention, but the invention claimed and described in a copending application of L. A. Kilgore and R. A. Baudry, filed March 11, 1939, Serial No. 261,356, entitled Electric couplings. The description and operation of the drive for pinion 15 involving engines 3 and 4 is substantially the same as the above-described drive involving engines 1 and 2, hence further description thereof is deemed unnecessary.

It will be noted that by the above-described drive, I am able to use but a single pinion which is driven by two separate engines, thereby eliminating the cost of a second pinion (when compared with certain well known designs), which is considerable, in view on the size of such pinion in ship propulsion systems. Another advantage of the above system is that a better layout of machinery in the engine room is achieved, as shown, which is an improvement over the conventional layout.

Another outstanding advantage of my system described above is that it provides smooth control from 0% to 100% speed in either direction of rotation for the propeller, by suitable operation of the phase reversing switch and by suitable reversal of some of the engines. Rated (100%) speed of the propeller would be the condition with both engines running and the generator frequently positively superimposed on the wound rotor coupling.

A brake on engine No. 2 or No. 3, $B^1$ and $B^2$, respectively, will permit the use of engine generator No. 1 and coupling No. 2 as a Diesel-electric drive in an emergency.

Another advantage of this drive is that it is possible to obtain 50% power with one engine. On direct connected or geared drives, it is possible to obtain but about 40% power on one engine out of two (rated torque and approximately 80% engine speed). On this drive the electrical equipment can be selected so that engine No. 2 will furnish its full power at approximately 80% of full power pinion speed, and engine No. 1 will increase the pinion speed to 100% when that engine is running at full speed and rated torque. For a specific example, a number of poles on the wound rotor coupling would be selected so that the frequency in the wound rotor at rated engine speed on No. 2 engine and the propeller stationary would be 120 cycles. Generator No. 1 would be designed for 30 cycles at rated engine speed. The propeller will run at 80% rated speed with no slip of the coupling and the speed will be increased to 80 (1+30/120) =100% when engine No. 1 is running at rated speed. Similarly, the system can be designed to give 25% power on one engine out of 4 compared with only 15% for other direct or geared drives.

I am, of course, aware that others, particularly after having had the benefit of the teachings of my invention, may devise other devices embodying my invention, and I, therefore, do not wish to be limited to the specific showings made in the drawing and the descriptive disclosure hereinbefore made, but wish to be limited only by the scope of the appended claims and such prior art that may be pertinent.

I claim as my invention:

1. A reversible electro-mechanical drive comprising, in combination, a reversible prime mover, an electromagnetic coupling having a salient pole, a direct current energized member driven by said prime mover and a wound rotor driven element, slip rings on said wound rotor driven element electrically connected to the wound rotor, a second non-reversible prime mover having an alternating current generator mechanically coupled thereto having an alternating current phase winding electrically connected to said slip rings and a load mechanically coupled to said wound rotor driven element, the frequency of said alternating current generator thereby being superimposed on the frequency induced in said wound rotor by said reversible prime mover.

2. A reversible ship propulsion system comprising in combination, a reversible prime mover, an electromagnetic coupling having a salient pole a direct current energized member driven by said prime mover and a wound rotor driven element, slip rings on said wound rotor driven element electrically connected to the wound rotor, a second non-reversible prime mover having an alternating current generator mechanically coupled thereto having an alternating current phase winding electrically connected to said slip rings, a pinion mechanically coupled to said wound rotor driven element and a propeller driven by said pinion, the frequency of said alternating current generator being thereby superimposed on the frequency induced in said wound rotor by said reversible prime mover so as to make it possible to drive said pinion at twice the speed of either prime mover.

3. A reversible ship propulsion system comprising, in combination, a pair of reversible prime movers, an electromagnetic coupling driven by each of said engines, each coupling having a salient pole, a direct current energized member driven by the engine and a wound rotor driven element having slip rings mounted thereon and electrically connected to the wound rotor winding, a pair of non-reversible prime movers, a pair of alternating current generators, each of which has a rotor driven by said non-reversible prime movers, which generators are each electrically connected to the slip rings associated with one of the reversible engines, a pair of pinions, each mechanically coupled to one of said driven elements of the electromagnetic couplings and a propeller mechanically coupled to said pinions.

4. A reversible ship propulsion system comprising, in combination, a pair of reversible prime movers, an electro-magnetic coupling driven by each of said engines, each coupling having a salient pole, a direct current energized member driven by the engine and a wound rotor driven element having slip rings mounted thereon and electrically connected to the wound rotor winding, a pair of non-reversible prime movers, a pair of alternating current generators, each of which has a rotor driven by said non-reversible prime movers which generators are each electrically connected to the slip rings associated with one of the reversible engines, a pair of pinions, each mechanically coupled to one of said driven elements of the electromagnetic couplings and a propeller mechanically coupled to said pinions, all of said prime movers being disposed in side by side parallel relationship.

5. Apparatus as set forth in claim 1, in which damper windings are provided on the pole faces of the salient poles of the electromagnetic coupling.

6. Apparatus as set forth in claim 2, in which damper windings are provided on the pole faces of the salient poles of the electromagnetic coupling.

7. Apparatus as set forth in claim 3, in which damper windings are provided on the pole faces of the salient poles of the electromagnetic coupling.

8. Apparatus as set forth in claim 4, in which damper windings are provided on the pole faces of the salient poles of the electromagnetic coupling.

9. Apparatus as set forth in claim 1, in which a brake is provided on the reversible prime mover for restraining the salient pole element of the electromagnetic coupling from rotation, thereby permitting drive solely by said non-reversible engine in case of emergency when said reversible engine is out of commission.

10. Apparatus as set forth in claim 2, in which a brake is provided on the reversible prime mover for restraining the salient pole element of the electromagnetic coupling from rotation, thereby permitting drive solely by said non-reversible engine in case of emergency when said reversible engine is out of commission.

11. Apparatus as set forth in claim 4, in which a brake is provided on each of said reversible prime movers for restraining the salient pole element of either electromagnetic coupling from rotation, thereby permitting drive solely by said non-reversible engine in case of emergency when either reversible engine is out of commission.

12. A reversible electro-mechanical drive, comprising, in combination, a reversible prime mover, an electromagnetic coupling driven thereby having a salient pole, a direct current energized element, a damper winding on the pole faces of said salient pole member, and a wound rotor element, slip rings on said wound rotor driven element electrically connected to the wound rotor, a second prime mover, an alternating current generator driven thereby said slip rings being connected to the output terminals of said alternating current generator, and a load mechanically coupled to said wound rotor driven element, which load is capable of being selectively driven in either of two directions at a speed corresponding to that of the added frequency of the alternating current generator output and the frequency induced in said wound rotor driven element by the rotation of said reversible prime mover.

13. Apparatus as set forth in claim 12, together with a brake on the driving element of said electromagnetic coupling for restraining it against rotation in the event said reversible prime mover is out of commission, in which case the drive is solely by said other prime mover.

JOHN S. NEWTON.